(12) United States Patent
Rice et al.

(10) Patent No.: US 10,330,455 B2
(45) Date of Patent: Jun. 25, 2019

(54) TRI-AXIAL CAPACITANCE PROBE WITH CASE INTEGRATED HOUSING

(71) Applicant: United Technologies Corporation, Farmington, CT (US)

(72) Inventors: Erik D. Rice, Lebanon, CT (US); Corey A. Benoit, Uncasville, CT (US); Marc Samit, Palm Beach Gardens, FL (US); Edward F. Dreger, III, Burlington, CT (US); Eli C. Warren, Wethersfield, CT (US); Kevin Ford, Middletown, CT (US); Michael G. Conigliaro, Waterbury, CT (US); Timothy Jarvis, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 100 days.

(21) Appl. No.: 15/269,393

(22) Filed: Sep. 19, 2016

(65) Prior Publication Data

US 2018/0080753 A1 Mar. 22, 2018

(51) Int. Cl.
| | | |
|---|---|---|
| *F01D 5/02* | (2006.01) | |
| *G01B 7/14* | (2006.01) | |
| *F01D 21/00* | (2006.01) | |
| *F01D 25/24* | (2006.01) | |
| *F04D 27/00* | (2006.01) | |
| *F04D 29/32* | (2006.01) | |
| *F04D 29/52* | (2006.01) | |
| *G01M 15/14* | (2006.01) | |

(52) U.S. Cl.
CPC ............... *G01B 7/14* (2013.01); *F01D 5/02* (2013.01); *F01D 21/003* (2013.01); *F01D 25/24* (2013.01); *F04D 27/001* (2013.01); *F04D 29/321* (2013.01); *F04D 29/325* (2013.01); *F04D 29/522* (2013.01); *G01M 15/14* (2013.01); *F05D 2220/32* (2013.01)

(58) Field of Classification Search
CPC .......................... G01B 17/14; H01B 13/0036
See application file for complete search history.

(56) References Cited

U.S. PATENT DOCUMENTS

| | | |
|---|---|---|
| 3,543,065 A | 11/1970 | Phelan et al. |
| 3,890,423 A | 6/1975 | Zacharias, Jr. |

(Continued)

FOREIGN PATENT DOCUMENTS

| | | |
|---|---|---|
| DE | 3617373 A1 | 11/1987 |
| FR | 2568004 A1 | 1/1986 |
| WO | WO9728418 A1 | 8/1997 |

OTHER PUBLICATIONS

EP search report for EP17191548.1 dated Jan. 19, 2018.

*Primary Examiner* — Noam Reisner
(74) *Attorney, Agent, or Firm* — O'Shea Getz P.C.

(57) ABSTRACT

A method is provided that involves a wall configured to circumscribe and be radially adjacent a rotor. During this method, a tri-axial capacitance probe is provided that includes a tri-axial conduit with an outer conductor member. The tri-axial capacitance probe is configured to output data indicative of a characteristic of the rotor. The tri-axial capacitance probe is configured within a wall aperture in the wall. The outer conductor member is electrically coupled with the wall. The wall is configured as a housing for the tri-axial capacitance probe.

12 Claims, 8 Drawing Sheets

(56) References Cited

U.S. PATENT DOCUMENTS

| | | |
|---|---|---|
| 4,162,111 A | 7/1979 | Brown |
| 4,455,754 A | 6/1984 | Benjamin |
| 4,544,859 A | 10/1985 | Eoff |
| 5,101,165 A * | 3/1992 | Rickards .............. G01B 7/14 324/662 |
| 5,119,036 A | 6/1992 | Rickards et al. |
| 6,268,683 B1 | 7/2001 | Li |
| 6,374,676 B1 | 4/2002 | Arnold et al. |
| 6,546,824 B2 | 4/2003 | Easton |
| 6,774,623 B2 | 8/2004 | Palfenier et al. |
| 6,848,193 B1 | 2/2005 | Kirzhner |
| 6,851,306 B2 | 2/2005 | Shost et al. |
| 7,153,023 B2 | 12/2006 | Howard et al. |
| 7,215,129 B1 | 5/2007 | Andarawis et al. |
| 7,414,413 B2 | 8/2008 | Crum et al. |
| 7,554,324 B2 | 6/2009 | Gualtieri |
| 7,688,081 B2 | 3/2010 | Webster |
| 7,876,093 B2 | 1/2011 | McMillen et al. |
| 8,002,517 B2 | 8/2011 | Razzell et al. |
| 8,344,741 B2 | 1/2013 | Sheikman et al. |
| 8,558,538 B2 | 10/2013 | Phillips et al. |
| 8,773,115 B2 | 7/2014 | Phillips et al. |
| 8,922,203 B2 | 12/2014 | Wickstead et al. |
| 8,970,228 B2 | 3/2015 | Andarawis et al. |
| 9,064,486 B2 | 6/2015 | Sato |
| 2013/0093413 A1 | 4/2013 | Itonaga et al. |
| 2014/0090492 A1 | 4/2014 | Warren |

* cited by examiner

TRI-AXIAL CAPACITANCE PROBE WITH CASE INTEGRATED HOUSING

BACKGROUND OF THE INVENTION

1. Technical Field

This disclosure relates generally to a capacitance probe and a method for assembling a capacitance probe.

2. Background Information

Various types of capacitance probes are known in the art. While these probes have various advantages, they may be expensive and/or require a relative large mounting area. Therefore, there is a need in the art for an improved capacitance probe and method for assembling and mounting that probe.

SUMMARY OF THE DISCLOSURE

According to an aspect of the present disclosure, a method is provided involving a wall configured to circumscribe and be radially adjacent a rotor. This method includes: providing a tri-axial capacitance probe including a tri-axial conduit that includes an outer conductor member, the tri-axial capacitance probe configured to output data indicative of a characteristic of the rotor; and configuring the tri-axial capacitance probe within a wall aperture in the wall, where the outer conductor member is electrically coupled with the wall, and the wall is configured as a housing for the tri-axial capacitance probe.

According to another aspect of the present disclosure, an assembly is provided for rotational equipment. This assembly includes a rotor and a wall circumscribing and radially adjacent the rotor. The assembly also includes a tri-axial capacitance probe within an aperture in the wall. The tri-axial capacitance probe is configured to output data indicative of a characteristic of the rotor. The tri-axial capacitance probe includes a tri-axial conduit that includes a tubular outer conductor member directly electrically coupled with the wall.

The rotational equipment may be configured as a gas turbine engine.

The providing the tri-axial capacitance probe may include: assembling the tri-axial capacitance probe in a fixture, where the fixture is configured as a temporary housing for the tri-axial capacitance probe; and removing the tri-axial capacitance probe from the fixture, for example, as a module without a housing.

The providing the tri-axial capacitance probe may include: mating the tri-axial conduit with a fixture aperture extending through a fixture; and temporarily bonding the outer conductor member to the fixture.

The providing the tri-axial capacitance probe may include: abutting an annular outer insulator against and bonding the outer insulator to the outer conductor member using non-conductive material; and temporarily bonding the outer insulator to the fixture within a counterbore of the fixture aperture. An intermediate conductor member of the tri-axial conduit may project into the outer insulator. An inner conductor member of the tri-axial conduit may project through the outer insulator.

The providing the tri-axial capacitance probe may include: nesting an annular guard within and bonding the guard to the outer insulator using non-conductive material; and electrically coupling the guard with the intermediate conductor member.

The providing the tri-axial capacitance probe may include: nesting an annular inner insulator within and bonding the inner insulator to the guard using non-conductive material. The inner conductor member may project through the inner insulator.

Non-conductive material may be included and axially between the inner insulator and intermediate conductor member.

The providing the tri-axial capacitance probe may include: nesting a sensor within and bonding the sensor to the inner insulator using non-conductive material; and electrically coupling the sensor with the inner conductor member.

The sensor may be configured as or otherwise include an annular sensor plate. The inner conductor member may project through the sensor plate. The providing the tri-axial capacitance probe may include: removing a portion of the inner conductor member that projects out from the sensor plate.

The providing the tri-axial capacitance probe may include: breaking the temporary bond between the outer conductor member and the fixture and between the outer insulator and the fixture; and removing the tri-axial capacitance probe from the fixture as a module. The configuring the tri-axial capacitance probe within the wall may include: bonding the outer conductor member to the wall with conductive material; and/or bonding the outer insulator to the wall with non-conductive material.

The tri-axial conduit may include an intermediate conductor member and an inner conductor member. The intermediate conductor member may be coaxial with, between and electrically isolated from the outer conductor member and the inner conductor member.

The tri-axial capacitance probe may include a sensor assembly nested in a counterbore in the wall. The sensor assembly may include a sensor and an annular guard. The sensor may be electrically coupled with the inner conductor member. The guard may be electrically coupled with the intermediate conductor member. The guard may be between and electrically isolated from the wall and the sensor.

The sensor assembly may include an annular outer insulator and an annular inner insulator. The outer insulator may be between and bonded to the wall and the guard. The inner insulator may be between and bonded to the guard and the sensor.

The tri-axial conduit may include a tubular intermediate conductor member and an inner conductor member. The intermediate conductor member may be coaxial with, between and electrically isolated from the outer conductor member and the inner conductor member.

The wall may be configured as a housing for the tri-axial capacitance probe.

The wall may include metal support structure and a ceramic coating radially between the metal support structure and the rotor. The outer conductor member may be directly electrically coupled with the metal support structure.

The rotor may include a rotor disk and a plurality of rotor blades arranged circumferentially around the rotor disk in an annular array. The tri-axial capacitance probe may be configured to provide data indicative of a radial clearance between at least one of the rotor blades and the wall.

The foregoing features and the operation of the invention will become more apparent in light of the following description and the accompanying drawings.

DETAILED DESCRIPTION OF THE INVENTION

Figure 1:
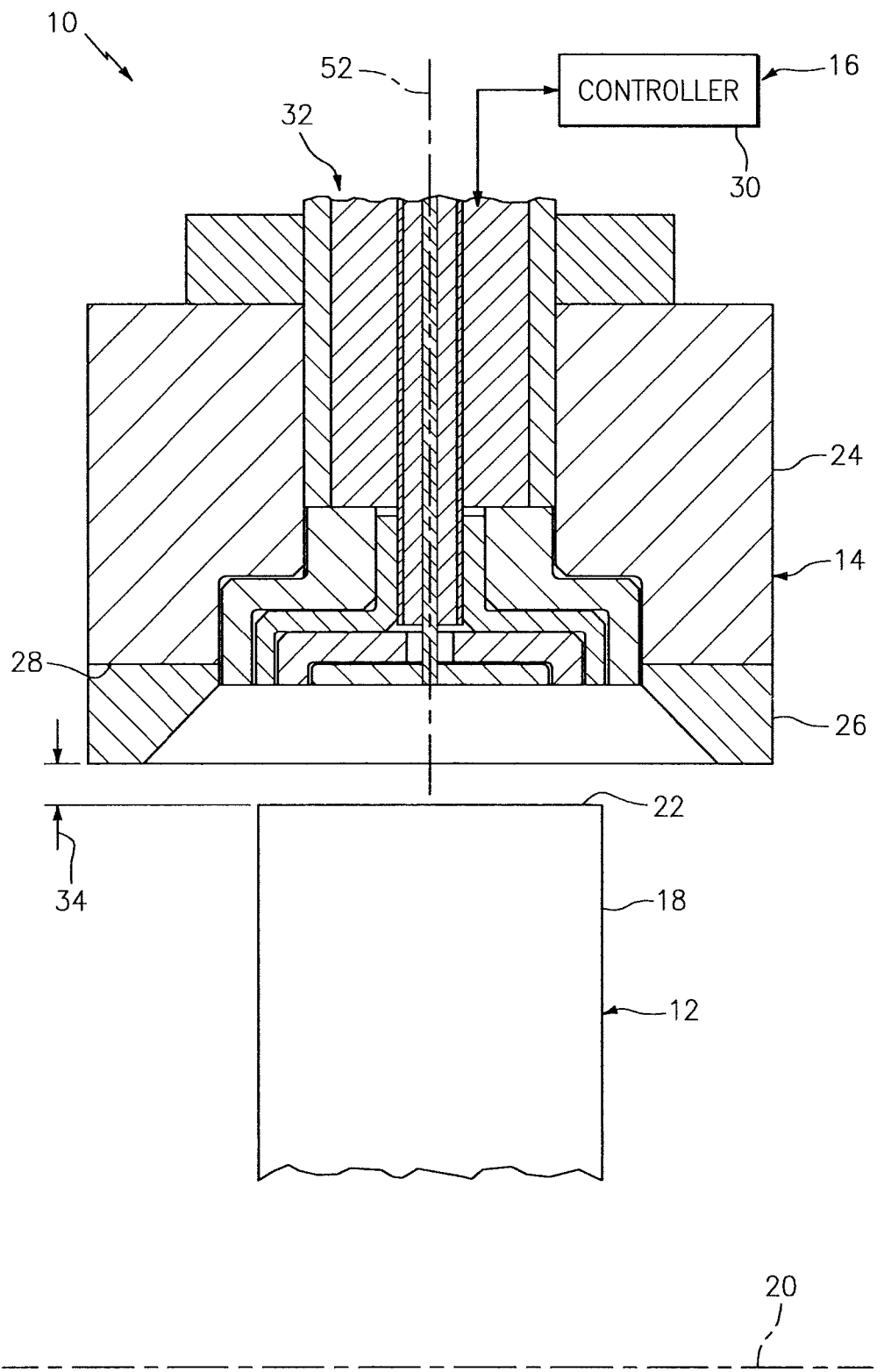
FIG. 1 is a schematic sectional illustration of a system with a tri-axial capacitance probe.

FIG. 1 illustrates a system 10 for rotational equipment. The rotational equipment may be configured and is described below for ease of description as a gas turbine engine. This gas turbine engine may be configured as or included in an aircraft propulsion system, an auxiliary power unit (APU), or an industrial gas turbine engine. However, the present disclosure is not limited to such exemplary gas turbine engine applications. Furthermore, the system 10 may alternatively be configured for a wind turbine, a water turbine or any other type of equipment (rotational or otherwise) which may include a probe as described below.

The turbine engine system 10 of FIG. 1 includes a rotor 12, a wall 14 and a sensor system 16. The rotor 12 may be configured as a fan rotor, a compressor rotor, a turbine rotor or any other type of rotor included in the gas turbine engine. The rotor 12 of FIG. 1, for example, includes at least one rotor disk (not shown) and a plurality of rotor blades 18 (one shown), which are arranged circumferentially around the rotor disk and its rotational axis 20 in an annular array.

The wall 14 may be configured with a generally tubular full-hoop body. The wall 14, for example, extends circumferentially around and axially along the rotational axis 20. The wall 14 thereby circumscribes the rotor 12. The wall 14 is also radially adjacent an outer periphery of the rotor 12; e.g., tips 22 of the rotor blades 18. The wall 14 of FIG. 1, for example, may be configured as a (e.g., abradable) blade outer air seal, a shroud, a turbine engine case or any other structure that forms a flow path wall within the turbine engine and around the rotor 12.

The wall 14 of FIG. 1 includes a metal support structure 24 and a ceramic coating 26; e.g., an abradable ceramic coating. The metal support structure 24 is configured as a base of and provides structure to the wall 14. The ceramic coating 26 is disposed on a radially interior surface 28 of the metal support structure 24. The ceramic coating 26 is located radially between the metal support structure 24 and the rotor 12, thereby forming an outer peripheral boundary of a flow path.

The sensor system 16 includes a controller 30 and one or more tri-axial capacitance probes 32 (one shown). The controller 30 may be implemented with a combination of hardware and software. The hardware may include a memory and at least one processing device, which may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations. The memory may be configured as a non-transitory computer readable medium.

Each tri-axial capacitance probe 32 is in signal communication (e.g., hardwired and/or wirelessly coupled) with the controller 30. Each tri-axial capacitance probe 32 is configured to output data to the controller 30 that is indicative of a characteristic of the rotor 12. For example, the tri-axial capacitance probe 32 of FIG. 1 is configured to output data indicative of a clearance 34 (e.g., a radial distance) between the rotor 12 and the wall 14. More particularly, the output data indicative of the clearance 34 between the tips 22 of the rotor blades 18 and the ceramic coating 26. However, in other embodiments, the output data may also or alternatively be indicative of other rotor characteristics; e.g., rotor speed, a one per revolution signal, etc.

Figure 2:
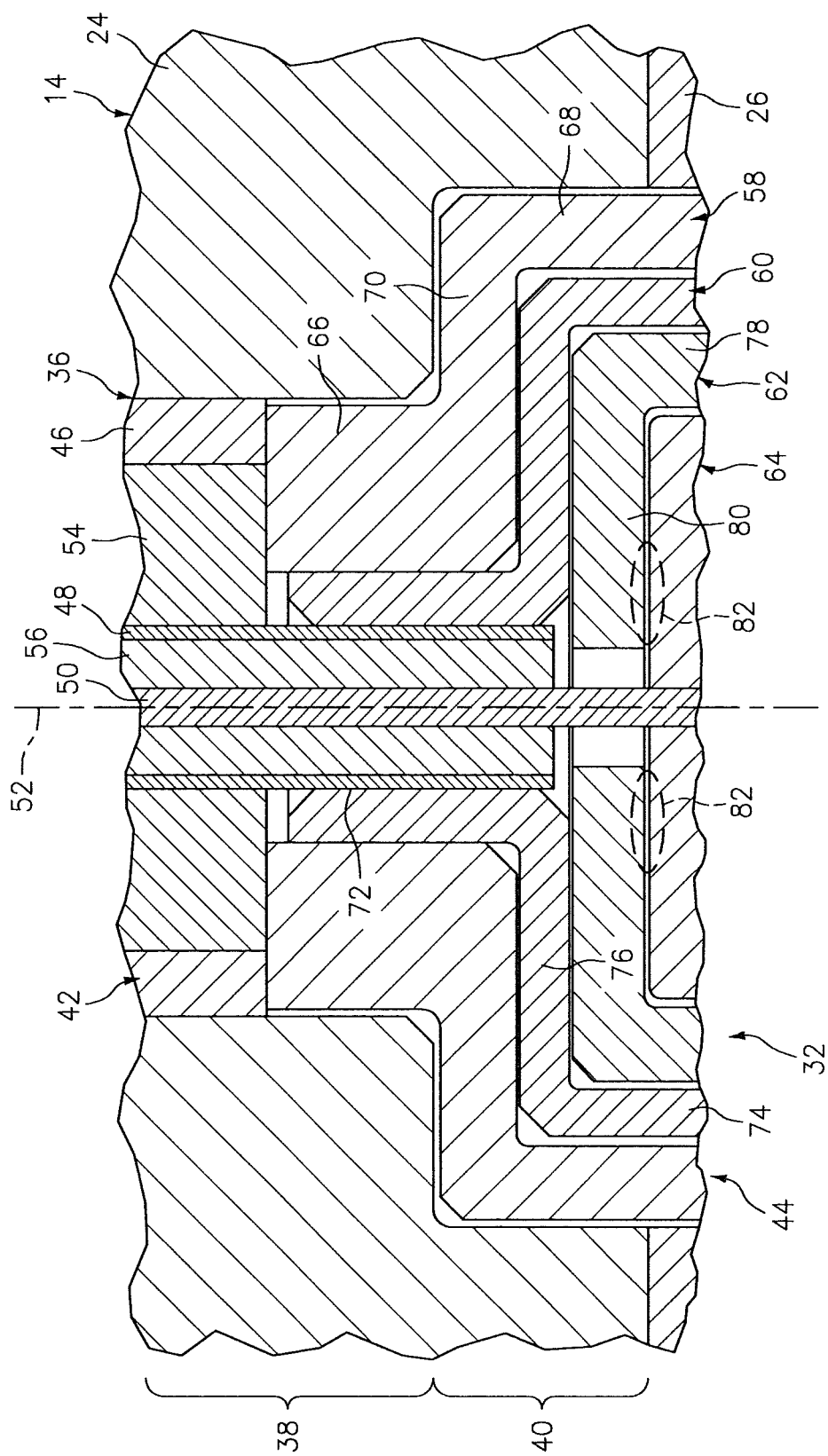
FIG. 2 is a schematic sectional illustration the tri-axial capacitance probe configured within a wall.

The tri-axial capacitance probe 32 of FIG. 2 is mated with a wall aperture 36 extending radially through the wall 14. This wall aperture 36 includes a bore 38 and a counterbore 40, which extends partially radially into the metal support structure 24 from the interior surface 28 to the bore 38. With this configuration, as described below in further detail, the wall 14 forms a housing for the tri-axial capacitance probe 32. This may enable the tri-axial capacitance probe 32 to take up less space for mounting since it does not require a separate housing to contain the components of the probe 32; e.g., the wall 14 may be the only housing for the probe 32.

The tri-axial capacitance probe 32 of FIG. 2 includes a tri-axial conduit 42 and a sensor assembly 44. The tri-axial conduit 42 is generally arranged within the bore 38. The sensor assembly 44 is generally within the counterbore 40.

The tri-axial conduit 42 includes a tubular outer conductor member 46, a tubular intermediate conductor member 48 and an inner conductor member 50 (e.g., an inner wire). The conductor members 46, 48 and 50 are arranged co-axial with one another along a probe axial centerline 52. The intermediate conductor member 48 is disposed between, but electrically isolated from, the outer conductor member 46 and the inner conductor member 50. In particular, a tubular outer insulator member 54 is between the outer conductor member 46 and the intermediate conductor member 48. A tubular inner insulator member 56 is between the intermediate conductor member 48 and the inner conductor member 50.

The outer conductor member 46 is directly electrically coupled with the metal support structure 24 of the wall 14. For example, there may be a tight fit between the outer conductor member 46 and the metal support structure 24. In addition or alternatively, the outer conductor member 46 may be bonded to the metal support structure 24 by conductive material; e.g., conductive adhesive material.

The sensor assembly 44 includes an annular outer insulator 58, an annular guard 60, an annular inner insulator 62 and a sensor 64. The outer insulator 58 includes an annular interior rim 66, an annular exterior rim 68 and an annular shelf 70 (e.g., a jog). This shelf 70 connects and extends radially (relative to the probe axial centerline 52) between the interior rim 66 and the exterior rim 68. The outer insulator 58 is nested within the wall aperture 36, where the interior rim 66 projects into the bore 38, the exterior rim 68 is within the counterbore 40, and the shelf 70 is abutted axially (relative to the probe axial centerline 52) against the metal support structure 24. The interior rim 66 is also abutted axially (relative to the probe axial centerline 52) against a distal end of the outer conductor member 46 and the outer insulator member 54. The outer insulator 58 is bonded to the wall 14 by non-conductive material; e.g., non-conductive adhesive material. Such non-conductive material may also be between the interior rim 66 and the conduit components 46 and 54.

The guard 60 includes an annular interior rim 72, an annular exterior rim 74 and an annular shelf 76 (e.g., a jog). This shelf 76 connects and extends radially (relative to the probe axial centerline 52) between the interior rim 72 and the exterior rim 74. The annular guard 60 is nested within the outer insulator 58, where interior rim 72 is within the interior rim 66, the exterior rim 74 is within the exterior rim 68, and the shelf 76 is abutted axially (relative to the probe axial centerline 52) against the shelf 70. The guard 60 is bonded to the outer insulator 58 by non-conductive material; e.g., non-conductive adhesive material. The interior rim 72 is electrically coupled with the intermediate conductor member 48. For example, there may be a tight fit between the interior rim 72 and the intermediate conductor member 48. In addition or alternatively, the interior rim 72 may be bonded to the intermediate conductor member 48 by conductive material; e.g., conductive adhesive material.

The inner insulator 62 includes an annular exterior rim 78 and an annular plate 80. The exterior rim 78 is located at an outer periphery of the plate 80. The exterior rim 78 projects axially (relative to the probe axial centerline 52) out from the plate 80. The inner insulator 62 is nested within the guard 60, where the exterior rim 78 is within the exterior rim 74, and the plate 80 is abutted axially (relative to the probe axial centerline 52) against the shelf 76. The inner insulator 62 is bonded to the guard 60 by non-conductive material; e.g., non-conductive adhesive material. Such non-conductive material or potting material may also be between the plate 80 and the conduit components 48, 50 and/or 56.

The sensor 64 may be configured as an annular sensor plate. The sensor 64 is nested within the exterior rim 78 and abutted axially (relative to the probe axial centerline 52) against the plate 80. The sensor 64 is bonded to the inner insulator 62 by non-conductive material; e.g., non-conductive adhesive material. However, a gap may be left in the region 82 to ensure the non-conductive material does not disrupt electrical coupling between the sensor 64 and the inner conductor member 50. The sensor 64 is electrically coupled with the inner conductor member 50. For example, there may be a tight fit between the sensor 64 and the inner conductor member 50. In addition or alternatively, the sensor 64 may be bonded to the inner conductor member 50 by conductive material; e.g., conductive adhesive material.

Figure 3:
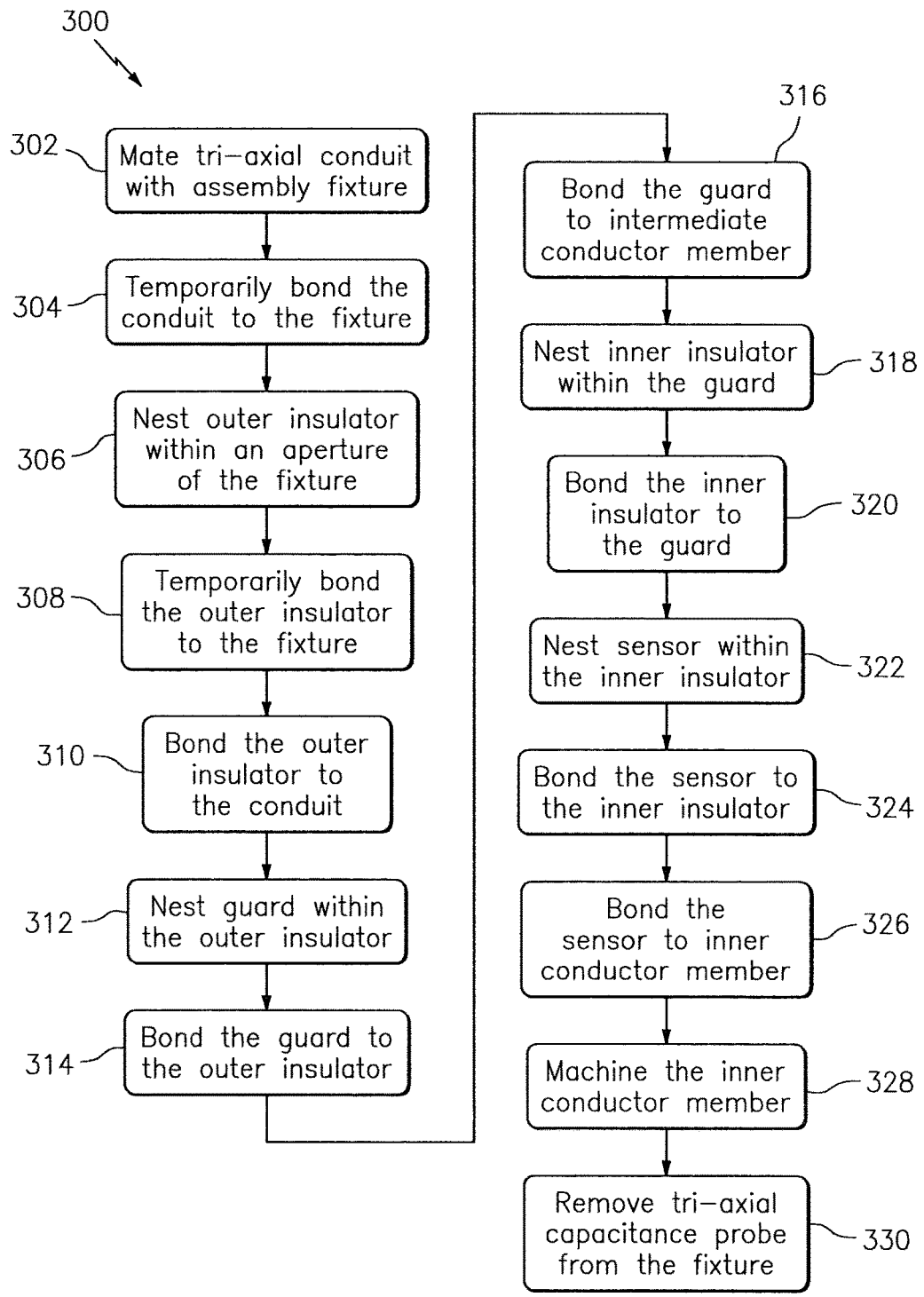
FIG. 3 is a flow diagram of a method for providing a tri-axial capacitance probe.

FIG. 3 is a flow diagram of a method 300 for providing (e.g., assembling) a tri-axial capacitance probe such as the probe 32 of FIG. 2. While this method 300 is described with reference to the probe 32 described above with respect to FIGS. 1 and 2, the method 300 may also be performed to assembly a probe with a different configuration.

Figure 4:
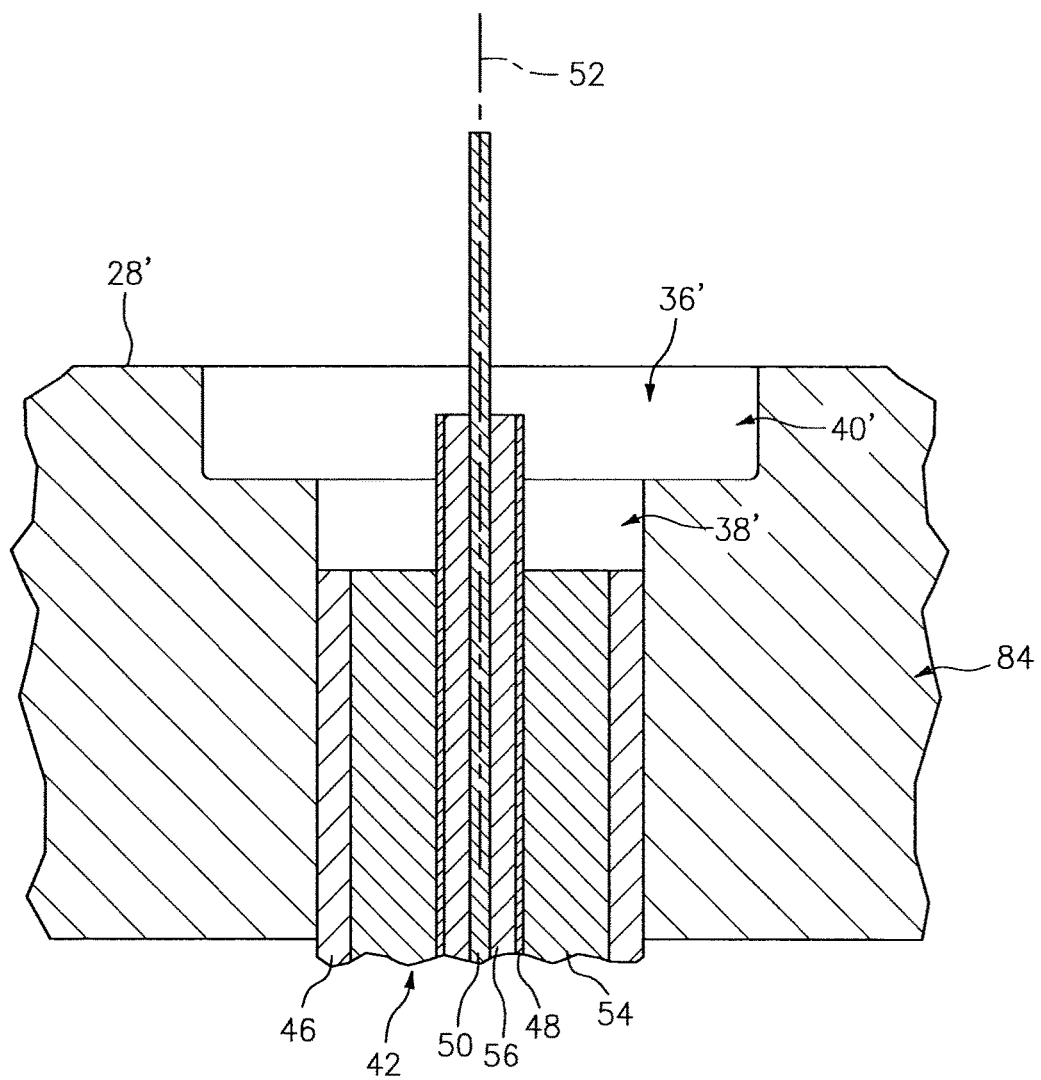
FIGS. 4-8 are a sequence of schematic sectional illustrations at different steps during the method of FIG. 3.

In step 302, the tri-axial conduit 42 is mated with an assembly fixture 84 as shown in FIG. 4. The tri-axial conduit 42, for example, is inserted into a fixture aperture 36' that extends axially through the fixture 84. The fixture aperture 36' includes a bore 38' and a counterbore 40', which are sized and configured the same as the bore 38 and counterbore 40 within the wall 14 (see FIG. 2). The conduit components 46 and 54 project axially into the bore 38', but are axially recessed from the counterbore 40'. The conduit components 48 and 56 project axially away from the conduit components 46 and 54 and into the counterbore 40', but are axially recessed from an interior surface 28'. The inner conductor member 50 projects axially away from the conduit components 48 and 56 and out of the aperture 36'.

In step 304, the tri-axial conduit 42 is temporarily bonded and/or otherwise attached to the fixture 84. For example, the outer conductor member 46 is temporarily bonded to the fixture 84 with an adhesive that decomposes and/or liquefies upon being subject to an elevated temperature, which elevated temperature is below a temperature which the probe 32 may be subjected during turbine engine operation.

Figure 5:
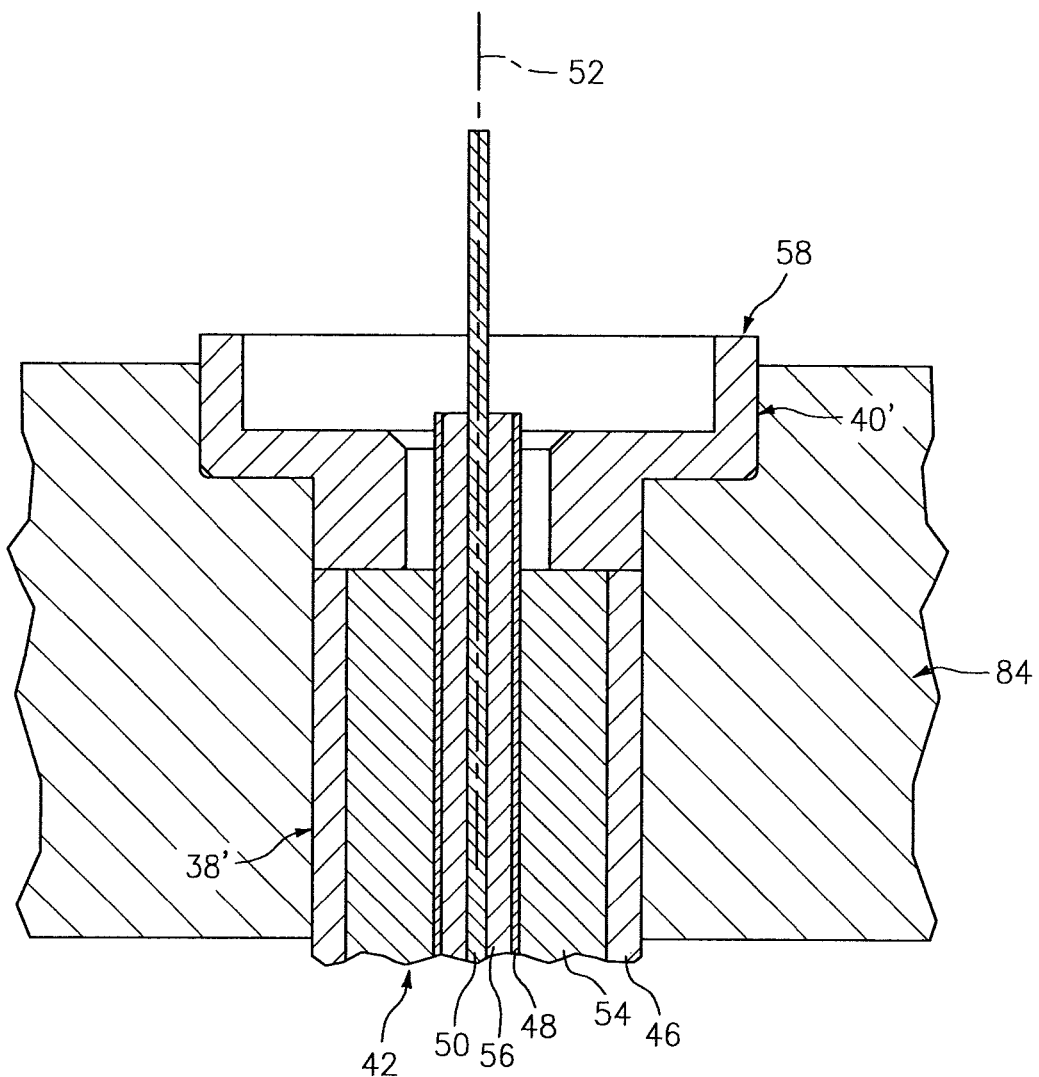

In step 306, the outer insulator 58 is nested within the aperture 36' as shown in FIG. 5.

In step 308, the outer insulator 58 is temporarily bonded and/or otherwise attached to the fixture 84. For example, the outer conductor member 46 is temporarily bonded to the fixture 84 with an adhesive that decomposes and/or liquefies upon being subject to an elevated temperature, which elevated temperature is below a temperature which the probe 32 may be subjected during turbine engine operation.

In step 310, the outer insulator 58 is (e.g., permanently) bonded and/or otherwise attached to the conduit components 46 and 54. For example, the outer conductor member 46 is bonded to the fixture 84 with a non-conductive adhesive that maintains a bond during engine operation.

Figure 6:
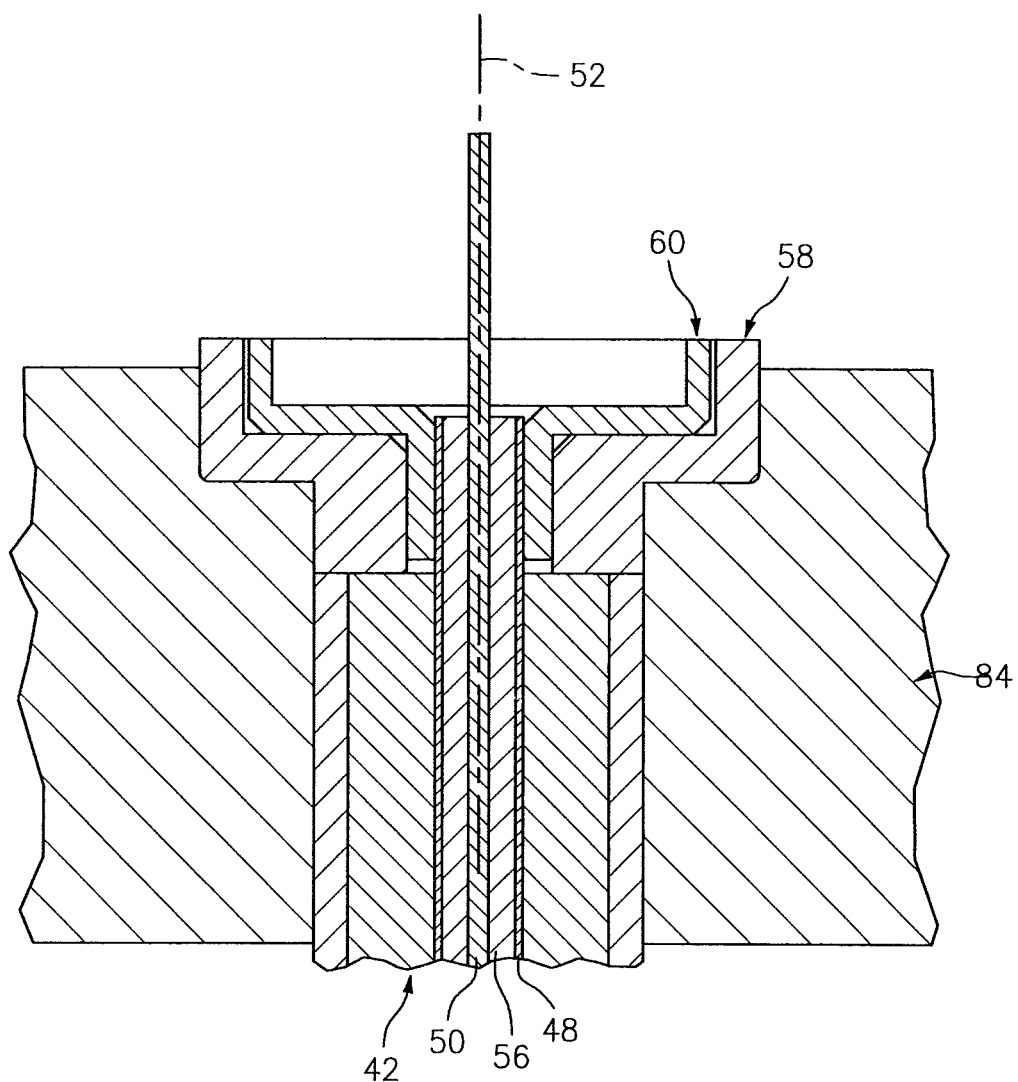

In step 312, the guard 60 is nested within the outer insulator 58 as shown in FIG. 6.

In step 314, the guard 60 is (e.g., permanently) bonded and/or otherwise attached to the outer insulator 58. For example, the guard 60 is bonded to the outer insulator 58 with a non-conductive adhesive that maintains a bond during engine operation.

In step 316, the guard 60 is (e.g., permanently) bonded and/or otherwise electrically coupled with the intermediate conductor member 48. For example, the guard 60 is bonded to the intermediate conductor member 48 with a conductive adhesive that maintains a bond during engine operation. The guard 60 and the intermediate conductor member 48 may also or alternatively be attached via a compression type fit.

Figure 7:
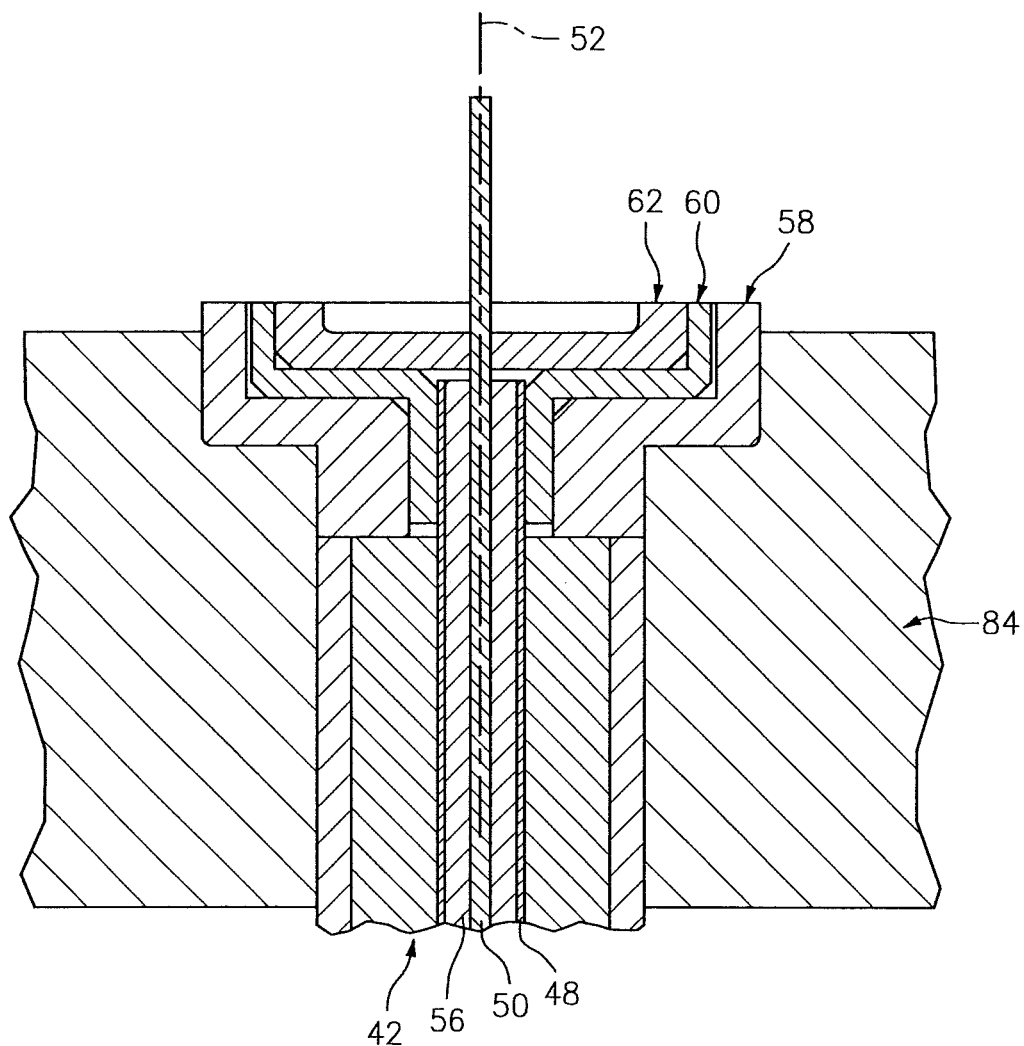

In step 318, the inner insulator 62 is nested within the guard 60 as shown in FIG. 7.

In step 320, the inner insulator 62 is (e.g., permanently) bonded and/or otherwise attached to the guard 60. For example, the inner insulator 62 is bonded to the guard 60 with a non-conductive adhesive that maintains a bond during engine operation. The inner insulator 62 may also be bonded to the inner insulator member 56 with a non-conductive adhesive.

Figure 8:
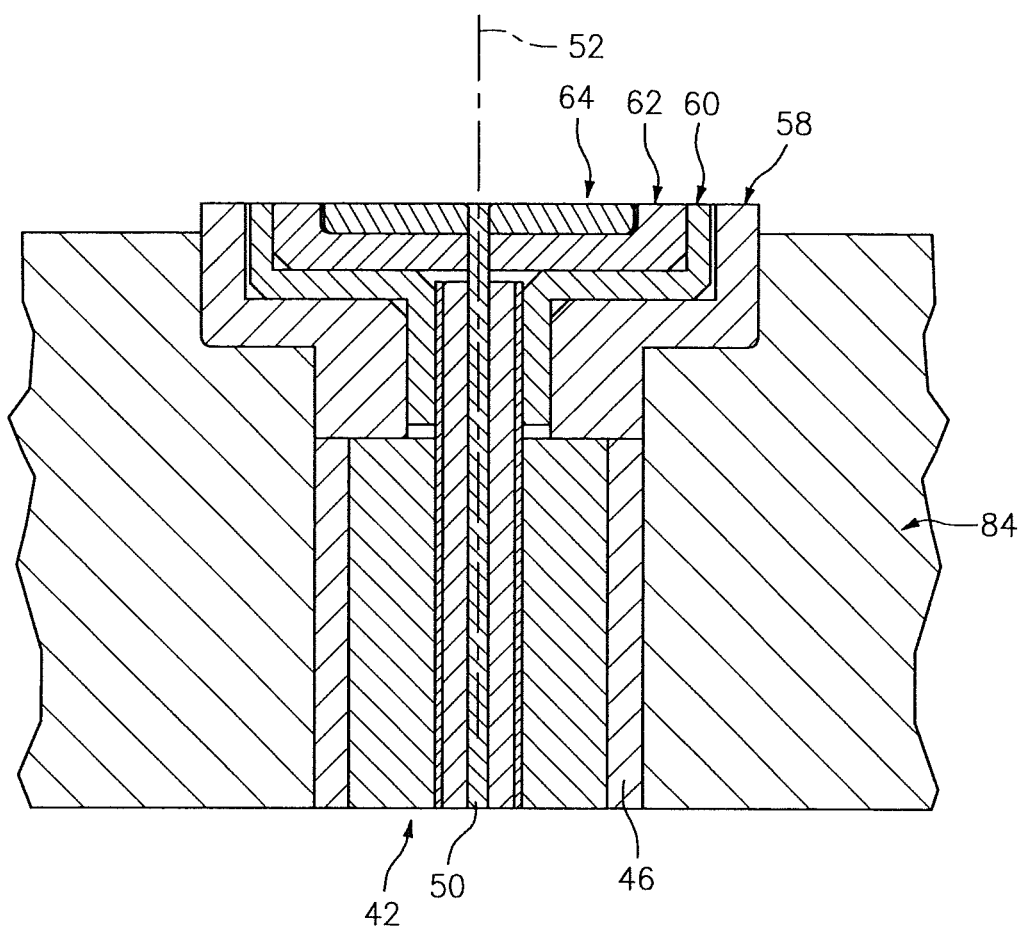

In step 322, the sensor 64 is nested within the inner insulator 62 as shown in FIG. 8.

In step 324, the sensor 64 is (e.g., permanently) bonded and/or otherwise attached to the inner insulator 62. For example, the sensor 64 is bonded to the inner insulator 62 with a non-conductive adhesive that maintains a bond during engine operation.

In step 326, the sensor 64 is (e.g., permanently) bonded and/or otherwise electrically coupled with the inner conductor member 50. For example, the sensor 64 is bonded to the inner conductor member 50 with a conductive adhesive that maintains a bond during engine operation. The sensor 64 and the inner conductor member 50 may also or alternatively be attached via a compression type fit.

In step 328, the inner conductor member 50 is machined (e.g., trimmed) to be substantially flush with the sensor 64. A portion of the inner conductor member 50 which projects out from the sensor 64, for example, may be cut off and/or ground down.

In step 330, the assembled tri-axial capacitance probe 32 is removed from the fixture 84. The adhesive between the components 46 and 58 and the fixture 84, for example, may be heated in order to break the adhesive bonds such that the tri-axial capacitance probe 32 may be removed from the fixture 84.

Following performance of the method 300, the tri-axial capacitance probe 32 is disposed within the wall aperture 36 and attached to the wall 14 as described above.

In some embodiments, rather than assembling the tri-axial capacitance probe 32 in the fixture 84, the tri-axial capacitance probe 32 may alternatively be assembled in situ with the wall 14.

In some embodiments, the ceramic coating 26 may be applied to the wall 14 before the tri-axial capacitance probes 32 are configured with the wall 14. In other embodiments, the ceramic coating 26 may be applied to the wall 14 after the tri-axial capacitance probes 32 are configured with the wall 14 where, for example, the probes 32 are masked during the coating application.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method involving a wall configured to circumscribe and be radially adjacent a rotor, the method comprising:
    providing a tri-axial capacitance probe comprising a tri-axial conduit that includes an outer conductor member, the tri-axial capacitance probe configured to output data indicative of a characteristic of the rotor, the providing of the tri-axial capacitance probe comprising:
        assembling the tri-axial capacitance probe in a fixture, wherein the fixture is configured as a temporary housing for the tri-axial capacitance probe; and
        removing the tri-axial capacitance probe from the fixture as a module without a housing; and
    configuring the tri-axial capacitance probe within a wall aperture in the wall, wherein the outer conductor member is electrically coupled with the wall, and the wall is configured as a housing for the tri-axial capacitance probe.

2. The method of claim 1, wherein the providing the tri-axial capacitance probe further comprises:
    mating the tri-axial conduit with a fixture aperture extending through the fixture; and
    temporarily bonding the outer conductor member to the fixture.

3. The method of claim 2, wherein the providing the tri-axial capacitance probe further comprises:
    abutting an annular outer insulator against and bonding the outer insulator to the outer conductor member using non-conductive material; and
    temporarily bonding the outer insulator to the fixture within a counterbore of the fixture aperture;
    wherein an intermediate conductor member of the tri-axial conduit projects into the outer insulator, and an inner conductor member of the tri-axial conduit projects through the outer insulator.

4. The method of claim 3, wherein the providing the tri-axial capacitance probe further comprises:
    nesting an annular guard within and bonding the guard to the outer insulator using non-conductive material; and
    electrically coupling the guard with the intermediate conductor member.

5. The method of claim 4, wherein the providing the tri-axial capacitance probe further comprises:
    nesting an annular inner insulator within and bonding the inner insulator to the guard using non-conductive material;
    wherein the inner conductor member projects through the inner insulator.

6. The method of claim 5, wherein non-conductive material is axially between the inner insulator and intermediate conductor member.

7. The method of claim 5, wherein the providing the tri-axial capacitance probe further comprises:
    nesting a sensor within and bonding the sensor to the inner insulator using non-conductive material; and
    electrically coupling the sensor with the inner conductor member.

8. The method of claim 1, wherein
    the tri-axial conduit further includes an intermediate conductor member and an inner conductor member; and
    the intermediate conductor member is coaxial with, between and electrically isolated from the outer conductor member and the inner conductor member.

9. The method of claim 8, wherein
    the tri-axial capacitance probe further comprises a sensor assembly nested in a counterbore in the wall, the sensor assembly comprising a sensor and an annular guard;
    the sensor is electrically coupled with the inner conductor member;
    the guard is electrically coupled with the intermediate conductor member; and
    the guard is between and electrically isolated from the wall and the sensor.

10. The method of claim 9, wherein
    the sensor assembly further comprises an annular outer insulator and an annular inner insulator;
    the outer insulator is between and bonded to the wall and the guard; and
    the inner insulator is between and bonded to the guard and the sensor.

11. A method involving a wall configured to circumscribe and be radially adjacent a rotor, the method comprising:
    providing a tri-axial capacitance probe comprising a tri-axial conduit that includes an outer conductor member, the tri-axial capacitance probe configured to output data indicative of a characteristic of the rotor; and
    configuring the tri-axial capacitance probe within a wall aperture in the wall, wherein the outer conductor member is electrically coupled with the wall, and the wall is configured as a housing for the tri-axial capacitance probe;
    wherein the providing the tri-axial capacitance probe further comprises:
        mating the tri-axial conduit with a fixture aperture extending through a fixture;
        temporarily bonding the outer conductor member to the fixture;
        abutting an annular outer insulator against and bonding the outer insulator to the outer conductor member using non-conductive material;
        temporarily bonding the outer insulator to the fixture within a counterbore of the fixture aperture, wherein an intermediate conductor member of the tri-axial conduit projects into the outer insulator, and an inner conductor member of the tri-axial conduit projects through the outer insulator;
        nesting an annular guard within and bonding the guard to the outer insulator using non-conductive material;
        electrically coupling the guard with the intermediate conductor member, wherein the providing the tri-axial capacitance probe further comprises nesting an annular inner insulator within and bonding the inner insulator to the guard using non-conductive material, and wherein the inner conductor member projects through the inner insulator;

nesting a sensor within and bonding the sensor to the inner insulator using non-conductive material; and electrically coupling the sensor with the inner conductor member;

wherein the sensor comprises an annular sensor plate, and the inner conductor member projects through the sensor plate; and wherein the providing the tri-axial capacitance probe further comprises removing a portion of the inner conductor member that projects out from the sensor plate.

12. A method involving a wall configured to circumscribe and be radially adjacent a rotor, the method comprising:

providing a tri-axial capacitance probe comprising a tri-axial conduit that includes an outer conductor member, the tri-axial capacitance probe configured to output data indicative of a characteristic of the rotor; and configuring the tri-axial capacitance probe within a wall aperture in the wall, wherein the outer conductor member is electrically coupled with the wall, and the wall is configured as a housing for the tri-axial capacitance probe;

wherein the providing the tri-axial capacitance probe further comprises:

mating the tri-axial conduit with a fixture aperture extending through a fixture;

temporarily bonding the outer conductor member to the fixture;

abutting an annular outer insulator against and bonding the outer insulator to the outer conductor member using non-conductive material;

temporarily bonding the outer insulator to the fixture within a counterbore of the fixture aperture, wherein an intermediate conductor member of the tri-axial conduit projects into the outer insulator, and an inner conductor member of the tri-axial conduit projects through the outer insulator;

nesting an annular guard within and bonding the guard to the outer insulator using non-conductive material;

electrically coupling the guard with the intermediate conductor member, wherein the providing the tri-axial capacitance probe further comprises nesting an annular inner insulator within and bonding the inner insulator to the guard using non-conductive material, and wherein the inner conductor member projects through the inner insulator;

nesting a sensor within and bonding the sensor to the inner insulator using non-conductive material;

electrically coupling the sensor with the inner conductor member;

breaking the temporary bond between the outer conductor member and the fixture and between the outer insulator and the fixture; and removing the tri-axial capacitance probe from the fixture as a module; and wherein the configuring the tri-axial capacitance probe within the wall comprises:

bonding the outer conductor member to the wall with conductive material; and bonding the outer insulator to the wall with non-conductive material.

\* \* \* \* \*